United States Patent
Saavedra

(10) Patent No.: US 12,235,022 B2
(45) Date of Patent: *Feb. 25, 2025

(54) HEAT TRANSFER DEVICE

(71) Applicant: John Saavedra, Irmo, SC (US)

(72) Inventor: John Saavedra, Irmo, SC (US)

( * ) Notice: Subject to any disclaimer, the term of this patent is extended or adjusted under 35 U.S.C. 154(b) by 675 days.

This patent is subject to a terminal disclaimer.

(21) Appl. No.: 17/362,337

(22) Filed: Jun. 29, 2021

(65) Prior Publication Data

US 2021/0325092 A1 Oct. 21, 2021

Related U.S. Application Data

(63) Continuation-in-part of application No. 15/929,507, filed on May 6, 2020, now Pat. No. 11,047,626, which is a continuation-in-part of application No. 15/889,905, filed on Feb. 6, 2018, now Pat. No. 11,255,585.

(51) Int. Cl.
*F25B 15/10* (2006.01)
*F25B 27/00* (2006.01)
*F25B 27/02* (2006.01)

(52) U.S. Cl.
CPC ............ *F25B 15/10* (2013.01); *F25B 27/007* (2013.01); *F25B 27/02* (2013.01); *F25B 2315/004* (2013.01)

(58) Field of Classification Search
CPC . F24S 10/95; F25B 27/007; F24F 2005/0064; F24F 5/0046
See application file for complete search history.

(56) References Cited

U.S. PATENT DOCUMENTS

| 4,146,013 A | * | 3/1979 | Foulke | F25B 27/007 62/235.1 |
| 4,209,007 A | * | 6/1980 | Collins | F24S 50/40 126/592 |
| 4,228,785 A | * | 10/1980 | Wagenseller | F24S 50/40 126/593 |
| 4,384,568 A | * | 5/1983 | Palmatier | F24D 19/1057 126/599 |

(Continued)

FOREIGN PATENT DOCUMENTS

WO WO2015196884 12/2015

*Primary Examiner* — Filip Zec
(74) *Attorney, Agent, or Firm* — Southeast IP Group LLC; Thomas L. Moses

(57) ABSTRACT

A refrigeration and/or heat transfer device includes a heating section and cooling section, a release member, and a one-way check valve affixed together in a continuous loop so working fluid may flow in one direction therein. The heating section absorbs heat and transfers such heat to the working fluid, thereby heating, expanding and increasing pressure upon the working fluid therein. The pressurized working fluid is released in a regulated manner from the heating section to the cooling section, thereby carrying the heat away. The released working fluid cools and transfers its heat to the surroundings within the cooling section. As released working fluid enters the cooling section, such fluid displaces already cooled working fluid, pushing such fluid through the one-way check valve back into the heating section to absorb heat. The working fluid may undergo a phase change or remain in a single phase throughout to enhance heat transfer.

18 Claims, 9 Drawing Sheets

(56) References Cited

U.S. PATENT DOCUMENTS

| | | | | |
|---|---|---|---|---|
| 4,671,253 | A * | 6/1987 | Blount, Sr. | F24S 40/60 |
| | | | | 126/584 |
| 4,682,476 | A * | 7/1987 | Payre | F25B 30/04 |
| | | | | 62/480 |
| 5,014,770 | A * | 5/1991 | Palmer | F24F 5/0046 |
| | | | | 165/48.2 |
| 6,997,010 | B2 * | 2/2006 | Suzuki | F25B 30/02 |
| | | | | 62/434 |
| 7,201,215 | B2 * | 4/2007 | Ippoushi | F24T 10/40 |
| | | | | 165/104.24 |
| 7,398,779 | B2 * | 7/2008 | Bowen | F24S 90/10 |
| | | | | 165/175 |
| 7,726,263 | B2 * | 6/2010 | Ben-Ishai | F24H 1/185 |
| | | | | 122/20 R |
| 8,613,195 | B2 * | 12/2013 | Held | F01K 3/185 |
| | | | | 60/660 |
| 8,794,003 | B2 * | 8/2014 | Mauran | F01K 27/005 |
| | | | | 60/645 |
| 8,931,277 | B2 * | 1/2015 | Peterson | F01K 25/08 |
| | | | | 60/659 |
| 10,378,830 | B2 * | 8/2019 | Schierack | F28D 20/0039 |
| 10,480,867 | B2 * | 11/2019 | Zhao | F28F 27/02 |
| 11,067,296 | B2 * | 7/2021 | Callemo | F24D 3/18 |
| 2007/0295477 | A1 * | 12/2007 | Mueller | F25B 13/00 |
| | | | | 165/45 |
| 2011/0259039 | A1 * | 10/2011 | Ma | F25B 15/02 |
| | | | | 62/495 |
| 2022/0161633 | A1 * | 5/2022 | Galansky | B60H 1/323 |

* cited by examiner

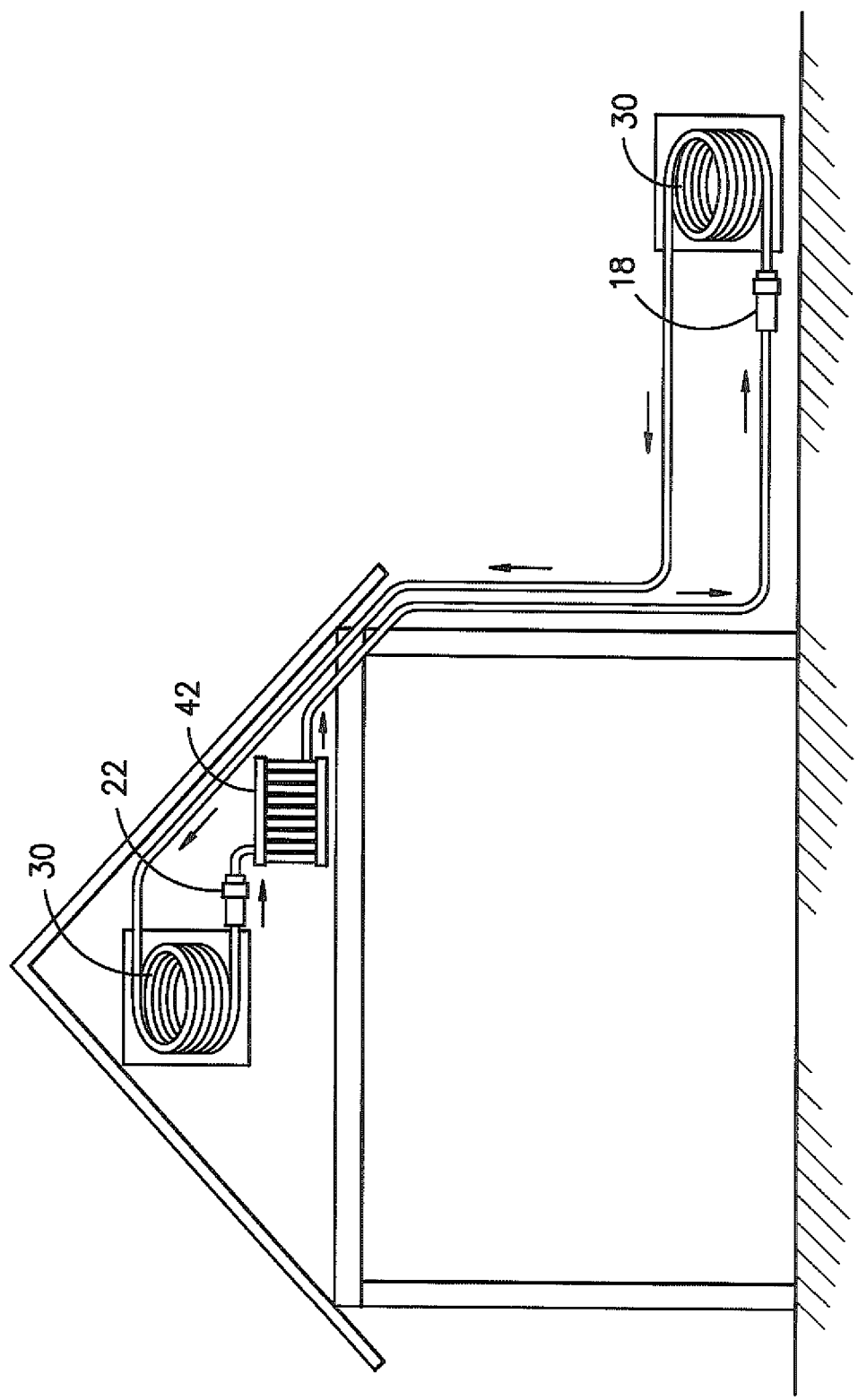

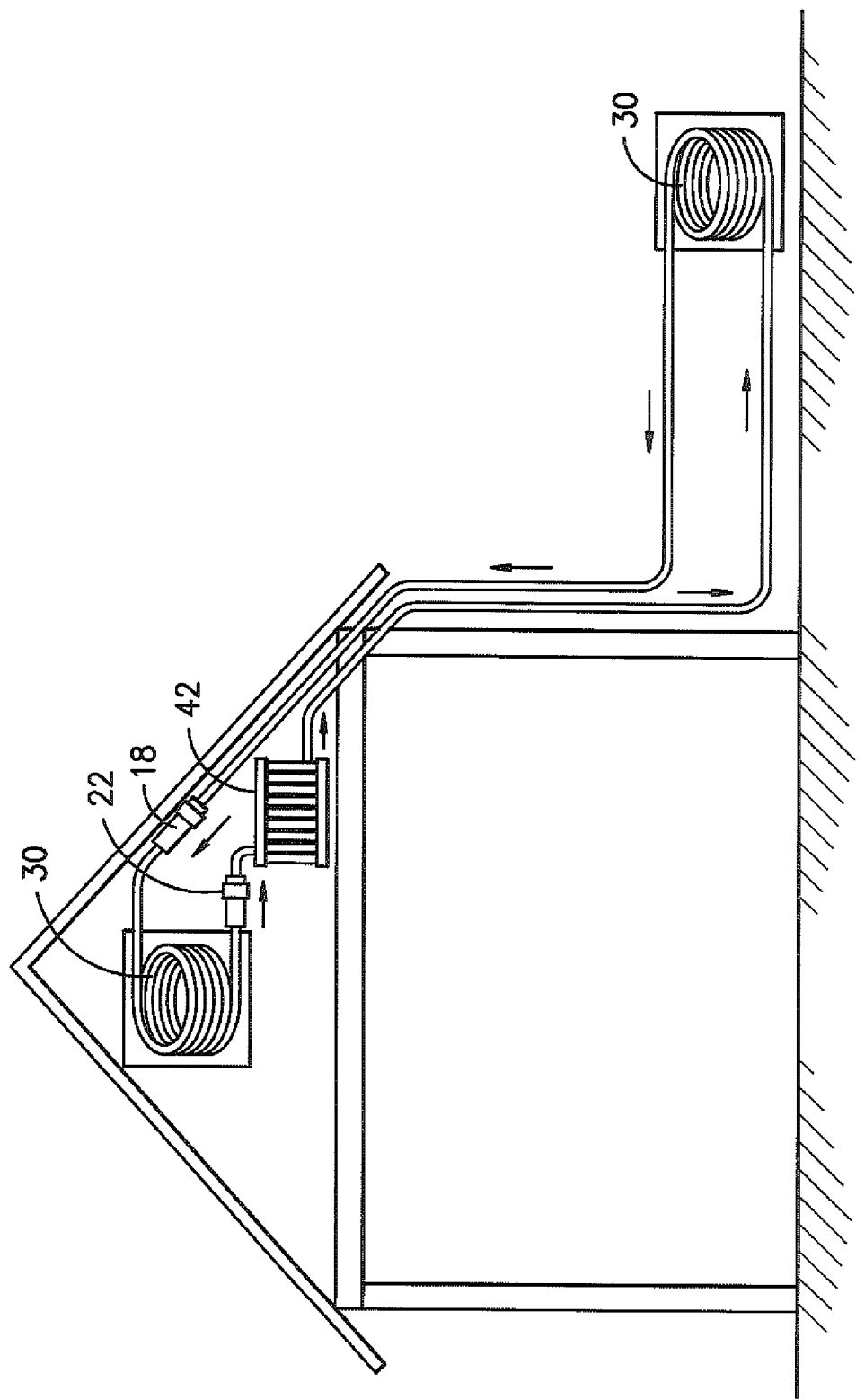

HEAT TRANSFER DEVICE

CROSS REFERENCE TO RELATED APPLICATIONS

The present application is a continuation in part of application Ser. No. 15/929,507 filed on May 6, 2020, which is a continuation in part of U.S. application Ser. No. 15/889,905, entitled Heat Transfer Device, filed on Feb. 6, 2018. All of the foregoing applications are hereby incorporated by reference in their entireties.

BACKGROUND

The transfer of heat is both a necessary and critical mechanism within a broad range of devices and processes. In fact, modern society now relies on many devices and processes utilizing heat transfer and/or refrigeration for, among other things, climate control of our houses, offices, cars, and food storage spaces. Refrigeration and/or the transfer of heat in most devices and processes, however, is an energy intensive exercise which can be costly, as it often involves the use of energy derived from fossil fuels and almost always utilizes an electro-mechanical compressor.

In addition to being costly and requiring large amounts of energy, many devices and processes involving refrigeration and/or the transfer of heat, are also bulky and complex with many different parts, stages, and underlying principles which limit their usefulness. In fact, due to their complexity, it is common for such devices and processes to have dedicated and trained personnel to design, install, maintain, and repair them.

However, many portions of the world have limited access to the wealth, experience, and reliable energy sources necessary to support such devices and processes. Further, even in industrialized portions of the world, many users now want simpler ways to lower costs and conserve energy for such devices and processes. Efforts to lower costs and energy requirements have been proposed involving alternative energy sources and devices with fewer energy-consuming parts. For example, U.S. Pat. No. 2,030,350 (1933), U.S. Pat. No. 3,242,679 (1964), and U.S. Pat. No. 4,744,224 (1988) disclose cooling systems utilizing solar energy. Also, conventional geothermal systems, utilizing the relatively constant temperature of the ground, are also well known. Further, U.S. Pub. No. 2014/0223957 discloses a refrigeration system which requires gravity- and a vertical arrangement to take advantage of such—to circulate working fluid and which operates without a compressor-one of the heaviest energy users in such a system. However, these prior efforts, and others like them, are complex, with many different parts and stages, are costly to manufacture, install, and maintain, require gravity to assist operation, or utilize electro-mechanical pumps, compressors, or blowers, and are not capable of being used in a variety of applications. Further, these prior efforts generally create significant amounts of noise.

Consequently, it would be advantageous to provide a device and method which, in one or more aspects, overcomes the aforementioned limitations of the current state of the art and is quiet, is of simple and inexpensive design, costs little to manufacture, install, and maintain, and provides desired heat transfer with fewer parts and stages and without the need for a specific arrangement utilizing gravity, fossil fuels or a conventional electro-mechanical compressor, pump, or blower. Each of the references mentioned above are hereby incorporated herein, in their entirety, by reference.

BRIEF SUMMARY

The present invention comprises a device and method that, in one or more aspects, provides desired heat transfer, without the need for energy from fossil fuels and is comprised of fewer parts and stages than many conventional heat transfer devices. Also, the device and method of the present invention, in one or more aspects, can produce refrigeration. That is, cooling to a temperature lower than ambient. Also, the device and method of the present invention, in one or more aspects, is quiet, is of simple and inexpensive design, and costs little to manufacture, install, and maintain. In certain aspects, the device and method provide heat transfer and/or refrigeration in a variety of applications without the need for a specific arrangement utilizing gravity, electricity, a conventional electro-mechanical compressor, an electro-mechanical blower, or an electro-mechanical pump, thereby lowering energy requirements, costs, and reducing the complexity of the apparatus. The device—in certain embodiments—may be used to lower energy requirements and costs by providing cooling or heating in a variety of applications, such as warming or cooling paved paths, municipal snow dumps or snow piles, attics and crawl spaces, swimming pools, cars, tents, and even solar panels—all without requiring the utilization of gravity or a conventional electro-mechanical compressor or pump, or electricity. In addition, the present device and method may be used either in concert with or as a replacement to other heat transfer devices and methods, such as a heating, ventilation, and air conditioning (HVAC) system. Other advantages of one or more aspects will be apparent from the drawings and ensuing description.

In accordance with one embodiment, heating and cooling sections of uninsulated conduit are affixed together in a continuous loop with a pressure relief valve and a one-way check valve so working fluid can flow in a single direction therein. In accordance with one aspect of operation, the heat transfer device is located within an area with a thermal gradient so that the heating section is in an area with a higher temperature than the area the cooling section is in. As heat is transferred to and absorbed by the working fluid in the heating section, working fluid therein pressurizes and heats. Due to the one-way check valve and release member, working fluid heating in the heating section becomes pressurized without use of a conventional, electro-mechanical compressor. Upon reaching a predetermined pressure, the pressurized working fluid is then forcibly released from the heating section into the cooling section through the pressure relief valve carrying the working fluid with absorbed heat away from the heating section and its surroundings. Working fluid within the cooling section then transfers such absorbed heat into the area surrounding the cooling section. In accordance with another aspect of operation, the pressurized working fluid released from the heating section may also vaporize, absorbing additional ambient heat, within or on the way to the cooling section.

Further, working fluid in the cooling section is displaced back into the heating section through the one-way check valve as additional working fluid is released from the heating section, thereby intermittently moving the working fluid without requiring a conventional electro-mechanical pump. However, in certain embodiments, the working fluid in the cooling section may also be drawn back into the heating section through the one-way check valve by a vacuum created therein during the release of heated working fluid therefrom. Thereby, heat may be carried away from the heating section and disposed of in the cooling section without requiring a conventional electro-mechanical compressor or pump, or a blower, lowering energy requirements and costs to either remove or provide heat in particular applications.

In an additional embodiment, the release member may be an orifice member—like an orifice plate—regulating the release of pressurized working fluid from the heating section, instead of a pressure relief valve. Thereby, such a device can release pressurized working fluid from the heating section through the release member in a more continuous flow. In addition, such an orifice member may also be adjustable to alter the flow of working fluid as desired. While an orifice plate has been provided as one example of a possible orifice member, it is foreseen that the orifice member may be any device utilizing an orifice capable of regulating the release of pressurized working fluid from the heating section.

Furthermore, in additional embodiments, one or both of the heating and cooling sections can include other elements capable of effectively enhancing the transfer of heat to or from a working fluid in a particular application of the device. For example, in some applications, the heating and cooling sections may include structural features, such as fins, ridges, dimples, spikes, or the like—to increase thermal transfer with respect to the working fluid. Also, parts of the device, including the heating and cooling sections, may include heat absorbing and heat reflecting coatings, such as a flat black paint or mirrored chrome paint, to affect the transfer of heat, as desired. Further, in some applications, the heating and cooling sections may include specific heat exchangers, such as radiators, evaporators, or condensers. Also, in particular applications, the heating and cooling sections may also include working fluid collection reservoirs, such as tanks or other vessels to hold working fluid as it is heated or cooled.

In another embodiment of the present invention, an additional section may be implemented into the system to enhance the heat transfer capabilities thereof. The additional section is called a Vaporization/Expansion/Evaporation (VEE) section, wherein the pressurized, heated working fluid is allowed to expand and vaporize, which absorbs ambient heat from the space around this section, leaving a cooler area behind.

DESCRIPTION OF THE DRAWINGS

These and other features, aspects, and advantages of the present invention will become better understood with regard to the following description, appended claims, and accompanying drawings where:

FIG. 8 is an elevation view of one embodiment of a heat transfer device that includes a pair of heat exchangers that are operationally connected to a VEE section in a heating and cooling loop.

FIG. 9 is an elevation view of an alternate embodiment of a heat transfer device that includes a pair of heat exchangers that are operationally connected to a VEE section in a heating and cooling loop.

REFERENCE NUMERALS

Figure 1:
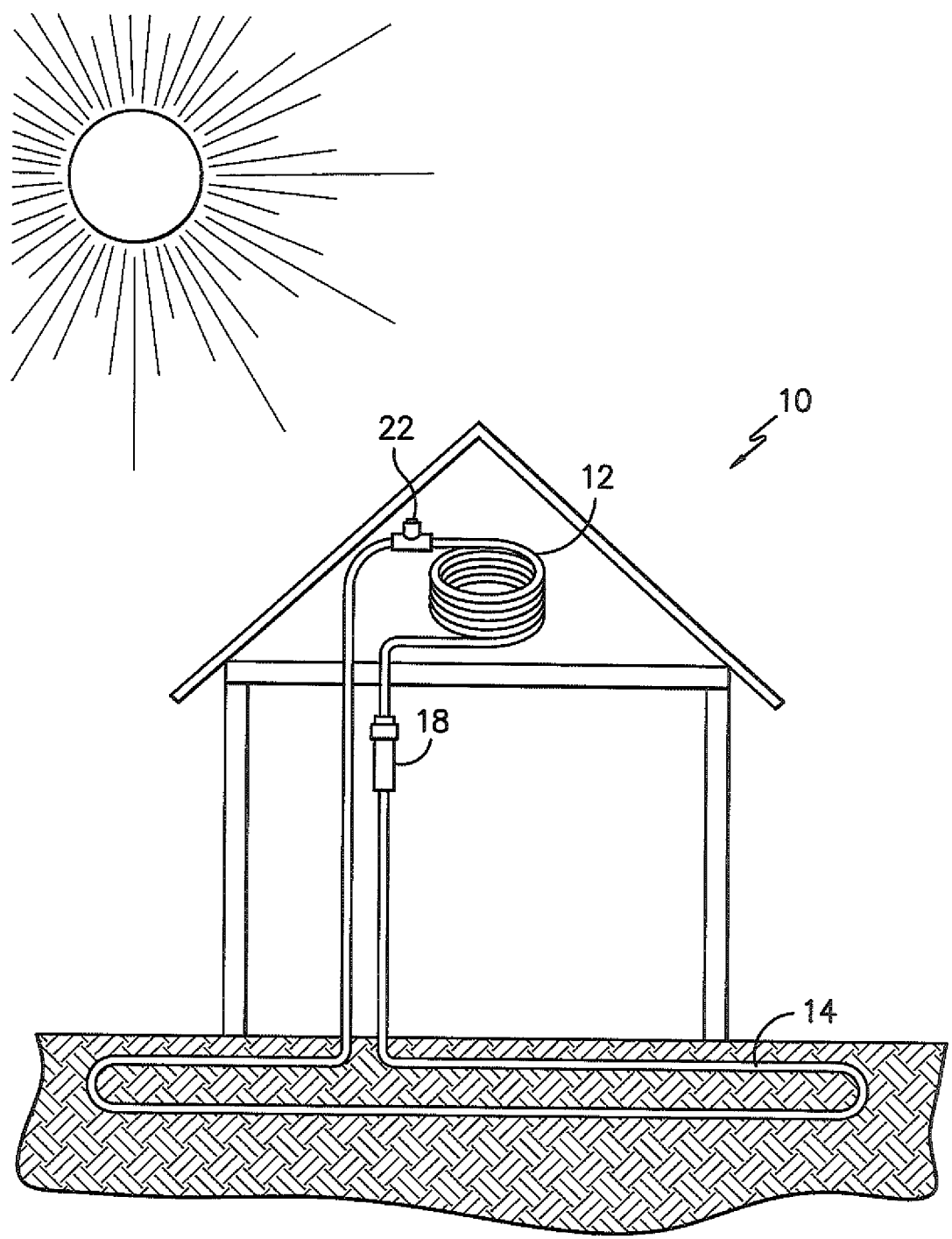
FIG. 1 is an elevation view of one embodiment of a heat transfer device being used to remove heat from an attic area having a heating section and cooling section connected in a continuous loop by a pressure relief valve and a one-way check valve.

| 10 | Device | 12 | Heating Section |
|---|---|---|---|
| 14 | Cooling Section | 18 | One-way Check Valve |
| 20 | Working Fluid | 22 | Pressure Relief Valve |
| 24 | Vessel | 26 | Orifice Member |
| 28 | Orifice Plate | 30 | Heat Exchange Device |
| 32 | Condensed Moisture Collector | 34 | Purification Mechanism |
| 36 | Lens | 38 | Snow |
| 40 | Paved Path | 42 | VEE Section |

DETAILED DESCRIPTION OF THE INVENTION

Definitions

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "fluid" is used herein within the usual scientific meaning of the word to include both liquids and gases. The term "condense" is used herein within the usual scientific meaning of the term, i.e. to change from a gas or vapor phase into a liquid phase. Further, the term "condensation" is used herein within the usual scientific meaning of the word to mean the change of the physical state of matter from gas or vapor phase into liquid phase.

Heat Transfer Device and Method of Use Generally

As shown in FIGS. 1-7, the present heat transfer device 10, in general, includes a heating section 12, cooling section 14, release member (e.g. 22, 26, 28), and a one-way check valve 18 all affixed together in a continuous loop so that a working fluid 20 generally flows in a single direction therethrough. In use generally, the heat transfer device 10 is placed within an area with a thermal gradient so that the heating section 12 is in an area with a higher temperature than the area where the cooling section 14 is located. For example, the heating section 12 could be disposed in an attic above a house while the cooling section 14 is disposed in the ground below a house, in a shadow of the house, in a river, or any location with a lower temperature than the area where the heating section 12 is located. Further, while the device 10 might be arranged in a vertical manner and gravity might have an effect on operation of the device 10, such arrangement and utilization of gravity is not required and the device 10 may be placed in any manner with relation to the higher and lower temperature areas of the thermal gradient.

In operation generally, heat is transferred to the working fluid 20 within the heating section 12 from the area surrounding the heating section 12. As the working fluid 20 heats within the heating section 12, the working fluid 20 therein attempts to expand and, due to the characteristics of the heating section 12 and placement of the release member and one-way check valve 18, becomes pressurized. After pressurizing, the working fluid 20 from the heating section 12 is forcibly released into the cooling section 14 carrying heat away from the heating section 12. Upon entering the cooling section 14, the working fluid 20 may cool due to adiabatic phase change, adiabatic expansion, or the transfer of its absorbed heat to an area surrounding the cooling section 14. Thereby, during operation of the heat transfer device 10, heat may be absorbed in the heating section 12 alone or, in an alternate embodiment, in both the heating section 12 and cooling section 14. The working fluid 20 entering the cooling section 14 displaces working fluid 20 already within the cooling section 14 back into the heating section 12 through the one-way check valve 18.

Internal Processes

The present heat transfer device 10 generally utilizes one or more of three internal processes to achieve heat transfer. Those three internal processes include 1) movement of heat by absorbing heat into the working fluid 20 in one area and transferring it out in another area, 2) adiabatic phase change of the working fluid 20 during its release into the cooling section 14, and 3) adiabatic expansion of working fluid 20 released into the cooling section 14. These three internal processes are utilized by the present heat transfer device 10 to achieve, one or both of, heat removal from a specific area and the addition of heat to a specific area.

Absorbing Heat in One Area and Transferring it Out in Another

Regarding the internal process of merely moving heat by absorbing it into the working fluid in one area and transferring it out in another area, consider one embodiment of the present heat transfer device 10 including heating and cooling sections 12, 14 of uninsulated conduit, a pressure relief valve 22 as the release member, a one-way check valve 18, and a glycol-based working fluid 20 where heat is removed from one area, an attic, and transferred out into another area, the ground—as shown in FIG. 1. Working fluid within the heating section 12 absorbs heat from the attic and as it attempts to expand becomes pressurized. Upon reaching a predetermined pressure, the pressure relief valve 22 opens to forcibly release working fluid with its absorbed heat into the cooling section 14 and shuts once enough working fluid 20 is released to lower the pressure within the heating section 12 below a predetermined amount. Heat from the working fluid is then transferred out of the cooling section 14 into the surrounding ground to be harmlessly dissipated. Working fluid 20 released from the heating section 12 also displaces working fluid 20 in the cooling section 14 through the one-way check valve 18 into the heating section 12. Thereby, heat may be removed from an area, like the attic, to cool such an area and harmlessly disposed into another area, like the ground, without use of conventional electro-mechanical pumps or compressors, or blowers. Such removal of heat from a house reduces the energy required to cool it.

Figure 2:
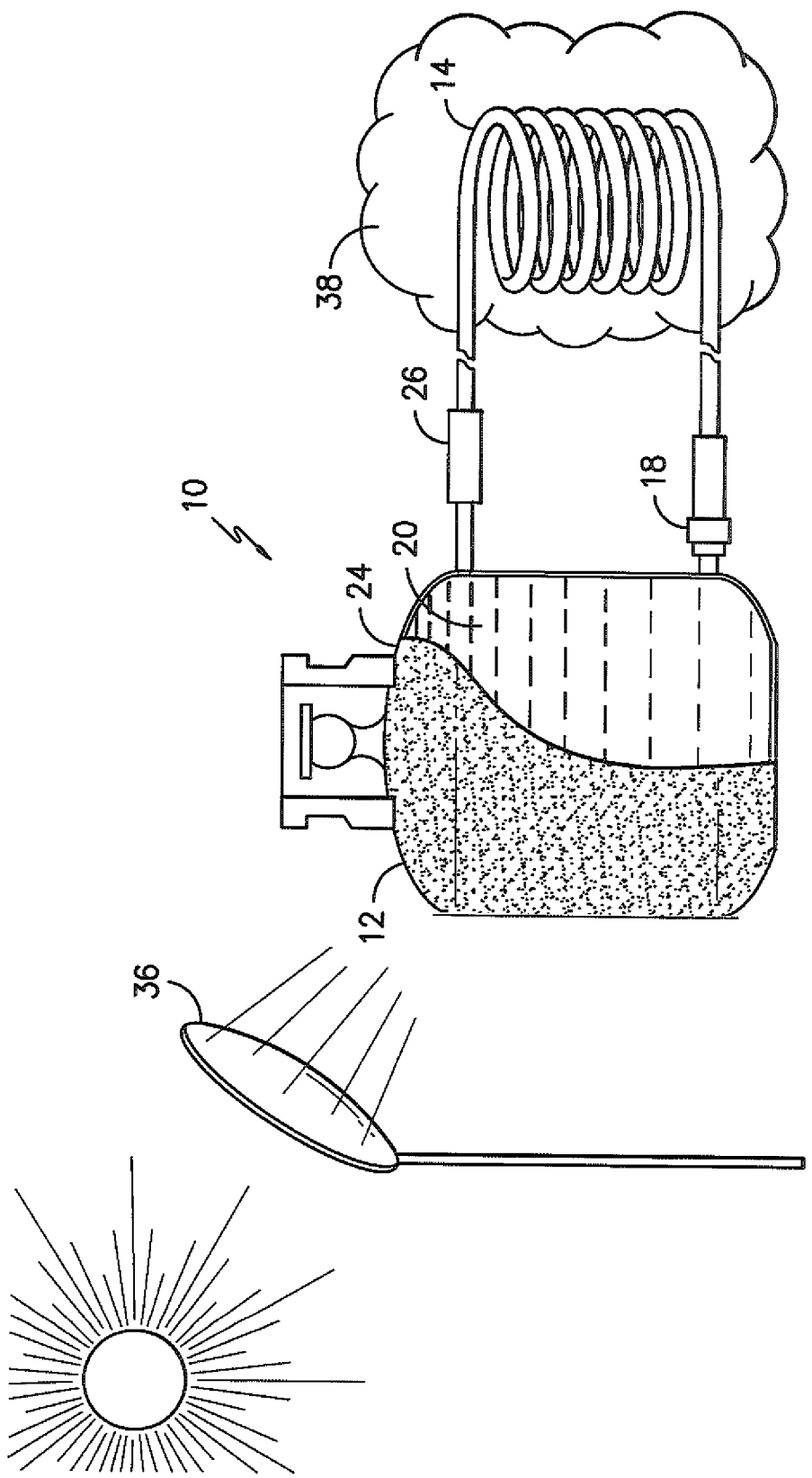
FIG. 2 is an elevation view of one embodiment of a heat transfer device being used to add heat to a snow pile, such as that at a municipal snow dump, having a heating section and cooling section connected in a continuous loop through an orifice member and a one-way check valve.
Figure 3:
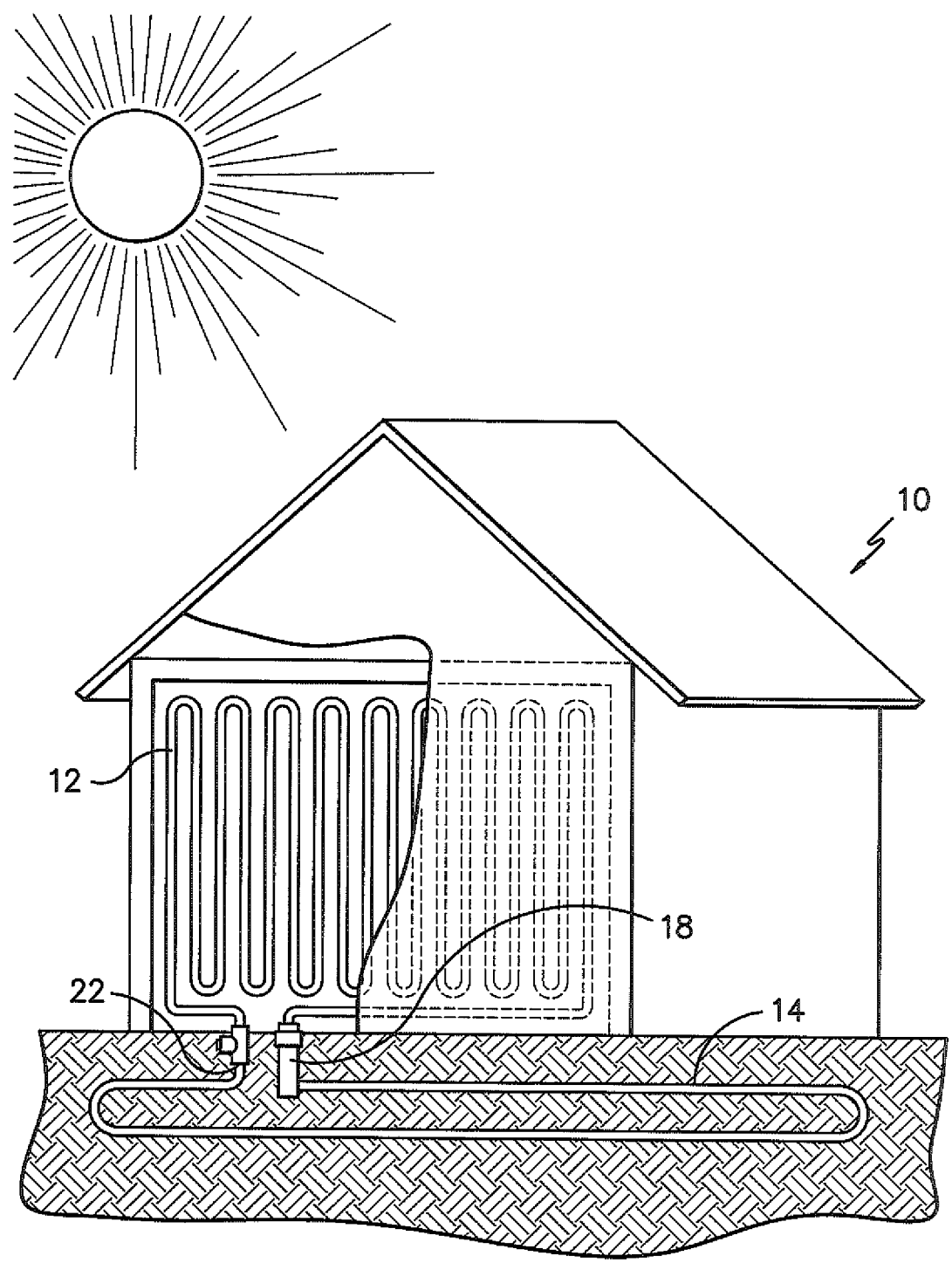
FIG. 3 is a perspective view of one embodiment of a heat transfer device being used to remove heat from the exterior walls or siding material of a building having a heating section within the wall of a structure and cooling section under the ground connected in a continuous loop by a pressure relief valve and a one-way check valve.

Conversely, one embodiment of the present heat transfer device 10 shown in FIG. 2, includes a tank vessel 24, which is painted with a flat black paint (represented by the speckled appearance of tank 24) and positioned at the focal point of at least one convex lens 36 as to increase the absorption of solar radiation, as heating section 12, a segment of uninsulated conduit located within a pile of snow 38 as the cooling section 14, a one-way check valve 18, an orifice member 26 as a release member, and corn oil as working fluid 20. The device of FIG. 2 may be utilized to add heat to the snow pile 38 to increase melting. Corn oil absorbs heat generated by solar radiation upon the tank vessel 24 of the heating section 12 and, as it attempts to expand, becomes pressurized therein. Upon becoming pressurized, the working fluid 20 passes through the orifice member 26 into the cooling section 14 with the absorbed heat. Heat from the corn oil is then transferred out of the cooling section 14 conduit into the surrounding snow pile to melt it. The working fluid 20 released form the heating section 12 displaces working fluid 20 already in the cooling section 14 back into the heating section 12 through the one-way check valve 18. Thereby heat may be added to an area, such as a snow pile, without use of a conventional electro-mechanical pump, compressor blower, combustion, or use of fossil fuels. Such melting is beneficial as it provides a solution to the longstanding problem of what to do with such pile which can linger for months after snow storms.

Figure 5:
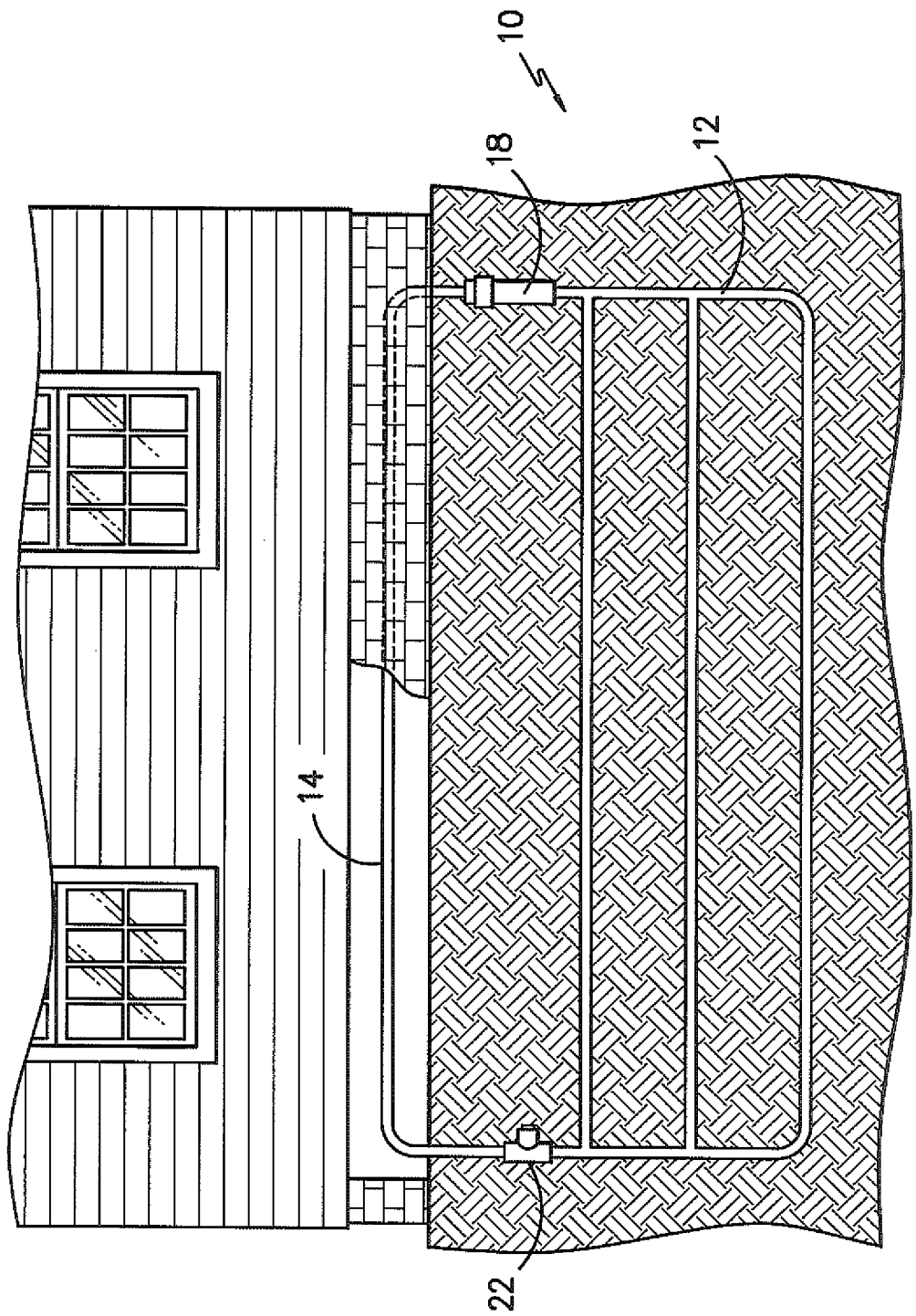
FIG. 5 is an elevation view of one embodiment of a heat transfer device being used to add heat to a crawl space beneath a house having a heating section and cooling section connected in a continuous loop by a pressure relief valve and a one-way check valve.

Alternatively, in another embodiment of the device 10, heat may be added to the crawl space of a house to help prevent pipes from freezing during winter and to augment home heating systems, as in FIG. 5. In FIG. 5, the device 10 includes a heating and cooling section 12, 14 of uninsulated conduit, a pressure relief valve 22, and a one way check valve 18 arranged so that n-butane (hereafter "butane") working fluid therein may cycle through in a single direction. In use, gaseous butane—butane vaporizes around 31° F.—absorbs heat from the ground below a house (i.e. geothermal heat) in the heating section 12 becoming pressurized therein. Upon reaching a predetermined pressure, the pressure relief valve 22 then opens and forcibly releases the gaseous butane into the cooling section 14. As the gaseous butane enters the cooling section 14, it carries with it the heat absorbed from the ground and radiates such heat to a crawl space area through which the cooling section 14 passes. As gaseous butane is forcibly released, it concurrently forces already cooled gaseous butane back into the heating section 12 through the one way check valve 18 to be reheated. Thereby the device 10 can provide heat to a crawl space during winter, as the ground temperature remains constant and such temperature is commonly above the ambient temperature above ground during winter.

Adiabatic Phase Change

Regarding the utilization of adiabatic phase change in the present device 10, such process may be utilized to help the device 10 remove heat from a specific area or add heat to a specific area. For example, to remove heat from an area utilizing adiabatic phase change, consider one embodiment of the present heat transfer device 10 having heating and cooling sections 12,14 of uninsulated conduit, a pressure relief valve 22 release member, one-way check valve 18, and acetone—which vaporizes around 31° F.—as working fluid 20 utilized to remove heat from a portion of a structure, such as the exterior walls of a house as in FIG. 3 or the attic of a structure as in FIG. 1. In use, the uninsulated conduit of the heating section 12 is located within the walls or attic of the structure and that of the cooling section 14 is located under the ground or in the shade. Heat created by solar radiation striking the walls or roof is absorbed into the acetone working fluid 20 through the heating section 12. Thereby, the temperature of the acetone is brought up to or over is normal boiling point and it is pressurized in the heating section 12. Upon reaching a predetermined pressure, the pressure relief valve 22 opens to forcibly release pressurized acetone into the cooling section 14. As it is released, the acetone vaporizes, lowering in temperature and eventually condensing back to liquid within the cooling section 14. The forceful release of pressurized acetone may also lower the pressure in the heating section 12 so that not only does the pressure relief valve 22 close but also the working fluid 20 remaining in the heating section 12 vaporizes and lowers in temperature, drawing in additional heat from the walls or attic (also discussed below regarding adiabatic expansion). Released acetone also displaces already condensed acetone within the cooling section 14 back into the heating section 12 through the one-way check valve 18. Thereby, the present heat transfer device 10, rather than merely transferring heat by moving it, may also utilize vaporization of some portion of a working fluid 20 and the heat required for such a phase change to enhance the transfer of heat from an area, such as a wall or attic.

Furthermore, it is also foreseen that in use, the present heat transfer device 10 utilizing adiabatic phase change may also remove heat from an area surrounding a portion of the cooling section 14, particularly that adjacent the release member. For example, in the previously outlined use involving the removal of heat from walls of a structure, it is possible that the acetone as it releases and vaporizes may also lower in temperature enough to also absorb heat from a portion of the cooling section 14 conduit adjacent the release member. It is foreseen that this cooling may be significant enough to be utilized to provide cooling or refrigeration by disposing such portion of conduit through an area in which cooling or refrigeration is desired, such as the wall or the inside of an insulated cooler. Thereby, the present heat transfer device 10 may be utilized, to also provide refrigeration without conventional electro-mechanical compressors, pumps, or blowers.

Figure 4:
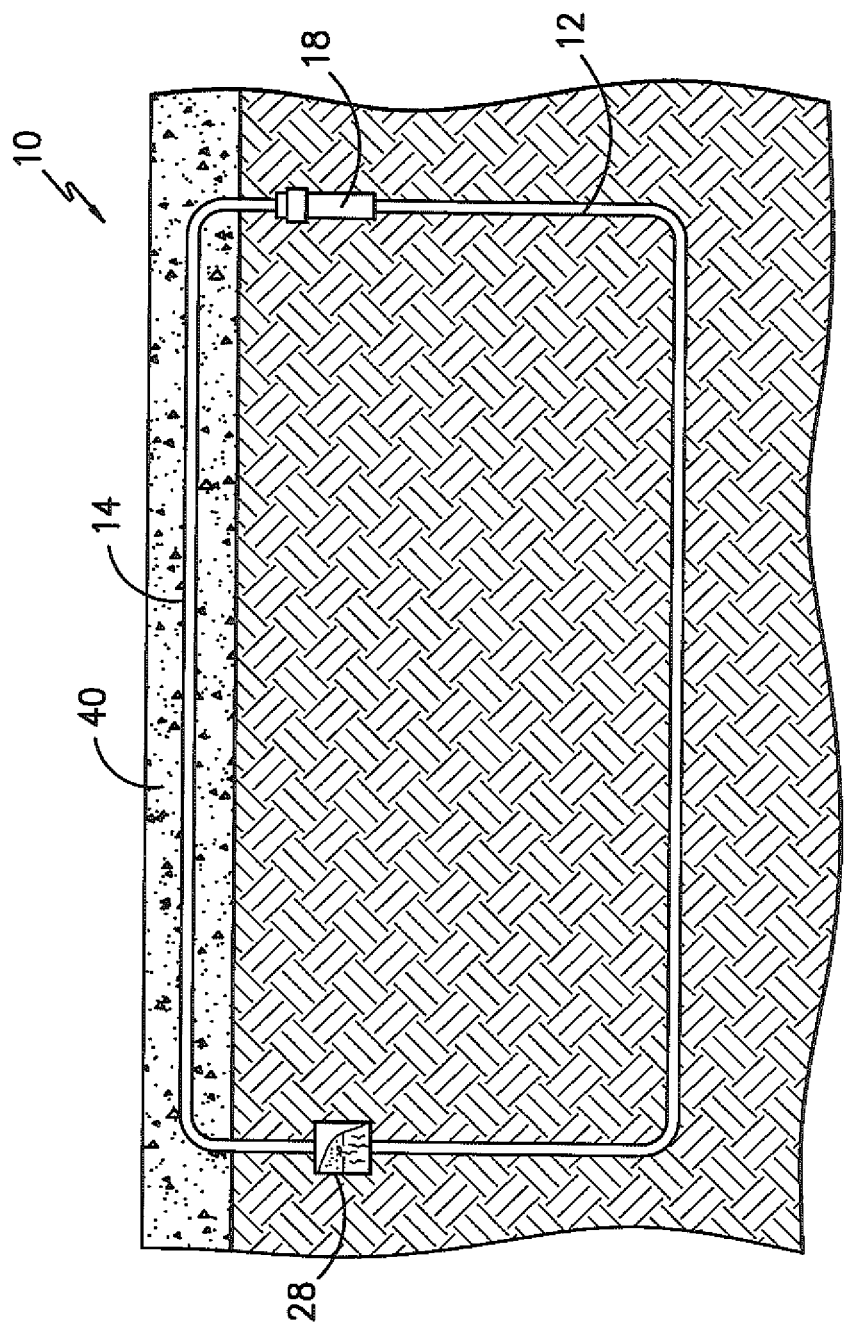
FIG. 4 is an elevation view of one embodiment of a heat transfer device being used to add heat to a paved path to reduce freezing having a heating section and cooling section connected in a continuous loop by an orifice plate and a one-way check valve and where the orifice plate has a cutaway portion to illustrate liquid working fluid, represented by squiggly lines, passing through the hole therein and vaporizing into gaseous working fluid, represented by dots.

Conversely, the present heat transfer device 10 utilizing adiabatic phase change may also be used to add heat to an area. For example, consider a device 10 having uninsulated conduit, such as polyethylene tubing, as heating and cooling section 12,14, an orifice member 26, particularly an orifice plate 28, a one-way check valve 18, and butane working fluid 20, which vaporizes around 31° F., utilized to add heat to a paved path 40 to prevent the formation of ice and accumulation of snow—as in FIG. 4. In use, the conduit of the heating section 12 is disposed at a depth underground, for example 4 feet, and the cooling section 14 is disposed within the substance of the paved path 40. Heat thereby may be absorbed from the ground through the heating section to heat and pressurize the butane working fluid 20. Thereupon the pressurized butane is released from the heating section 12 through the orifice plate 28, whereupon it vaporizes and passes into the cooling section 14 carrying away the absorbed heat. Orifice plate 28 is shown in FIG. 4 with a portion cutaway to illustrate that the liquid butane (represented by squiggly lines) changes to vaporized butane (represented by dots). Pressurized butane released from the heating section 12 also displaces already condensed working fluid 20 in the cooling section 14 back into the heating section 12 through the one-way check valve 18. The vaporized butane within the cooling section 14 gives up its heat to the surrounding paved path 40 substance to warm it and condenses back to liquid. Thereby, the present heat transfer device 10 utilizing adiabatic phase change may be utilized to add heat to a specific area, such as a paved path 40.

Adiabatic Expansion

Regarding the utilization of adiabatic expansion, the present heat transfer device may utilize such processes to remove heat from a specific area or add heat to a specific area. For example, consider an embodiment of the present device 10 utilized to heat a structure, like a car, trailer, or building like in FIG. 1. Thereby, the device has uninsulated conduit for both heating and cooling sections 12,14, a pressure relief valve 22 release member, and one-way check valve 18. Within, the device 10 utilizes gaseous butane as a working fluid 20. As in FIG. 1, the heating section 12 thereof may be placed in thermal contact with an area of the structure which is heated by solar radiation, like the attic, while the cooling section 14 is placed in thermal contact with a cooler area, such as the ground. As heat is produced in the attic, a portion thereof is absorbed by the gaseous butane, which pressurizes within the heating section 12. Upon reaching a predetermined pressure, the pressure relief valve 22 opens and heated pressurized butane is forcibly released therethrough into the cooling section 14. As the pressurized butane is rapidly released, pressure on the gaseous butane remaining within the heating section 12 is suddenly reduced. Just as rapidly increasing the pressure of a gas produces and gives off heat, rapidly decreasing the pressure of a gas—as may happen to gaseous butane during rapid release of working fluid through the pressure relief valve 22—absorbs heat. Thereby, gaseous butane remaining in the heating section 12 may absorb additional ambient heat from the area around the heating section 12. Likewise, released gaseous butane also forces already cooled butane already within the cooling section 14 through the one-way check valve 18 and back into the heating section 12 to absorb more heat. Thereby, the removal of heat from the area around the heating section 12 may be enhanced when the device 10 utilizes adiabatic expansion. Further such removal of heat may be achieved without use of conventional electro-mechanical pumps, compressors, or blowers.

Alternative Embodiments and Additional Elements

Heating and Cooling Sections

While the heating and cooling sections 12,14 of the earlier embodiments have been described as comprising segments of uninsulated conduit and tanks, it is foreseen that one or both of the heating and cooling sections 12,14 may take other forms in additional embodiments. For example, the heating or cooling sections 12,14 may comprise, uninsulated segments of conduit placed in a specific arrangement, such as the coiled arrangement of FIG. 1, or another specific pattern, such as a planar zig-zag or sigmoid, to enhance the transfer of heat between the working fluid 20 and a specific area. Further, the heating or cooling sections 12,14 may comprise vessels 24 capable of storing various amounts of working fluid 20, and specific heat exchange devices 30 to enhance heat transfer in alternative embodiments. For example, as previously mentioned in one embodiment, the present device 10 may comprise a tank vessel 24 heating section, as in FIG. 2. In an additional example, the present device 10 may have a radiator heat exchange device 30 as the heating or cooling section 12,14—such as the radiator of FIG. 7 including lines representing fins.

It is also foreseen that the placement of the heating and cooling sections 12,14 can enhance heat transfer. For example, placement of a heating section 12 in an area with higher temperatures may increase the thermal transfer of heat to the working fluid 20. Likewise, placement of a cooling section 14 in an area with lower temperatures may increase the thermal transfer of heat out of the working fluid 20. An exemplary example of placement choice and its effects can be seen when comparing locating a cooling section 14 below the ground versus a shaded area, where one provides a more consistent removal of heat over time. However, in particular embodiments, such as when the present device 10 is used on a car, a shaded area may be the only location feasibly available for placement of the cooling section 14.

Furthermore, it is foreseen that the heating and cooling sections 12,14 may have additional structural features to increase or decrease thermal transfer. For example, the conduit thereof may have fins, dimples, spikes, or the like which operate to increase the effective surface area of the conduit in thermal contact with the surrounding area. Further additional elements may also be provided to increase thermal transfer in certain applications, such as fans, mirrors, lenses, and heat absorbent coverings. For example, a tank heating section 12 may be covered in a heat absorbent covering, like a flat black paint, and placed in a focal area of one or more convex lenses focusing radiation from the sun, as in FIG. 2. Alternatively, it is also foreseen that portions of one or both of the heating and cooling sections 12,14 may be thermally insulated or have a heat reflective covering, such as mirrored chrome paint, to limit the areas in which heat can generally be transferred. The selection of these various elements, or features may be based on the use of the heat transfer device 10 and the characteristics of the desired working fluid 20. There are many means, features, and elements for enhancing efficient heat transfer and one skilled in the art will recognize that any suitable means for enhancing such heat transfer may be employed. Furthermore, one or both of the heating and cooling sections 12,14 may have multiple heat exchange devices or structural features operatively connected in tandem to enhance the transfer of heat by the device 10.

Figure 6:
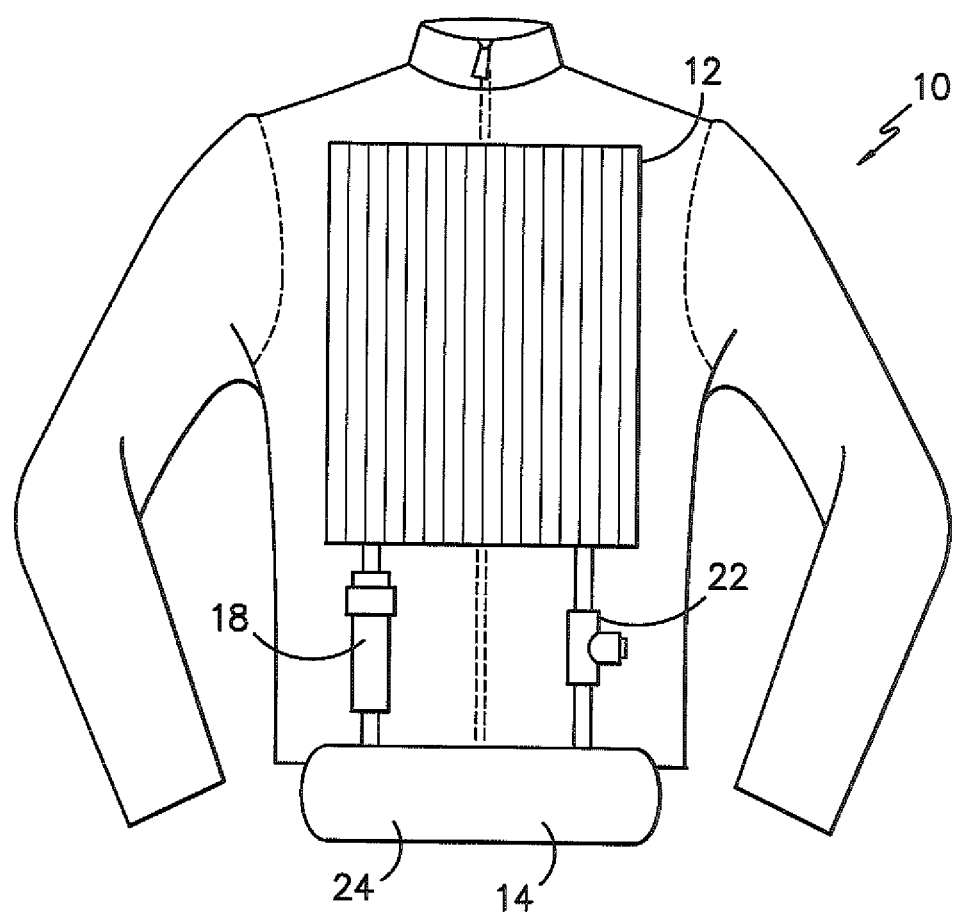
FIG. 6 is an elevation view of one embodiment of a heat transfer device disposed in a garment for the removal of heat from a person having a capillary heating section and vessel cooling section connected in a continuous loop.

It is also foreseen that the heating and cooling sections 12,14 may be any size which complements its internal operation and provides sufficient exposure to areas around both the heating and cooling sections 12,14 to allow for the transfer of heat. For example, one or both of the heating and cooling sections 12,14 may comprise capillary tubing as the conduit in particular embodiments, such as in clothing items wherein body heat is utilized as in FIG. 6. Such tubing-like the earlier conduit—may also be arranged in a specific pattern or network to increase the thermal transfer with the working fluid 20 passing therethrough. Also, in a further example the heating section 12 may comprise a tank shaped and sized to assist functioning of the device 10, like a 1000-gallon low profile rectangular tank vessel. Also, it is foreseen that—in particular to clothing—the heating and cooling sections 12,14 may be placed in any useful locations therein to effect the transfer of heat. As such, while FIG. 6 shows the heating section 12 as an arrangement of capillary tubing in the back portion of a garment and the cooling section 14 as a vessel 24 disposed outside and below the garment so that heat may be expelled therefrom, it is foreseen that the heating and cooling sections 12, 14 may be other forms and may be arranged in other ways to effect heat transfer. For example, the heating section 12 may be an arrangement of capillary tubing disposed inside the garment so that it is adjacent a wearer's skin and capable of absorbing heat therefrom and the cooling section 14 may be a section of capillary tubing arranged along or just below the exterior surface of the garment away from a wearer's skin to allow for the transfer of heat to the air around such garment.

In addition, it is foreseen that, in particular embodiments, the working fluid 20 may vaporize and cool in the cooling section 14 due to its rapid release into a lower pressure environment, further assisting the dispersal of heat absorbed in the heating section 12. For example, when a working fluid 20 has been heated to or above its boiling point in the heating section 12, it may—upon release through a release member and upon entering a sufficiently lower pressure environment in the cooling section 14—vaporize and absorb ambient heat, producing cooling.

In another embodiment, an additional section is added to enhance the transfer of heat, and that section is called a Vaporization/Expansion/Evaporation section 42, wherein the pressurized, heated working fluid is allowed to expand and vaporize, which absorbs ambient heat from the space around this section, leaving a cooler area behind. An example of this embodiment is shown in FIG. 8, wherein a first heat exchanger 30 is located in the attic of a house, along with a VEE section 42, and a second heat exchanger 30 (which acts as a heat sink) is positioned outside, and away from the house. The two heat exchangers 30 and the VEE section 42 are operationally connected in a loop, so that the working fluid may recirculate throughout the loop, absorbing heat in the attic through the first heat exchanger 30 and the VEE section 42, and then transferring that heat out to the second heat exchanger 30, where the heat will be rejected. Then, the cooler working fluid is transferred back to the attic to recirculate through the same cycle. In this embodiment, the pressure relief valve 22 is positioned between the first heat exchanger 30 and the VEE section 42, and the check valve 18 is positioned between the VEE section 42 and the second heat exchanger 30, and the conduit between the second heat exchanger 30 and the first heat exchanger 30 is thermally insulated. In an alternate embodiment, the pressure relief valve 22 is positioned between the first heat exchanger 30 and the VEE section 42, and the check valve 18 is positioned between the second heat exchanger 30 and the first heat exchanger 30, and the conduit between the second heat exchanger 30 and the first heat exchanger 30 is thermally insulated, as shown in FIG. 9.

In operation, the sun heats the fluid in the second heat exchanger 30, which causes the pressure of the working fluid to rise, but the working fluid is trapped between the check valve 18 and the pressure relief valve 22. Ambient heat is also absorbed in the first heat exchanger 30 in the attic. When the pressure builds enough to release working fluid, then the working fluid vaporizes in the VEE section 42, absorbing heat and leaving behind cooler air. The working fluid then condenses and falls by gravity (or a pump, in some instances) back to the second heat exchanger 30 in the yard.

This cycle is ongoing, as the working fluid recirculates through the heat transfer loop, as shown.

The VEE section 42 is designed to allow the pressurized, heated working fluid to expand and vaporize, which absorbs ambient heat from the space around that section (in the attic, in this particular example), so that in this embodiment, the VEE section 42 and the cooling section are one and the same. In one embodiment, the VEE section 42 may simply be an uninsulated conduit.

The VEE section 42 is intended as a confined area where the working fluid can expand and vaporize, so it may take the form of a vessel having a higher internal volume than the conduit that leads into it, conduit with a larger diameter, or any suitable container that allows for such expansion and vaporization.

Release Member

The release member may comprise a pressure relief valve 22, orifice member 26, or other structure of sufficient ability to restrict flow and allow for the build-up of pressure in the heating section 12 and forcible release of working fluid 20 therefrom. For example, the release member may comprise an orifice plate 28 which restricts the flow of the working fluid 20 as previously mentioned in regards to and shown in FIG. 4. The orifice plate 28, like other orifice members 26, restricts flow by requiring working fluid 20 to flow through an orifice of a diameter generally smaller than that of the conduit. The restriction of flow can cause increased pressure on one side of the orifice plate 28 while maintaining lower pressure conditions on the other. Thereby restriction can provide a higher pressure heating section 12 so as the working fluid is released into the cooling section 14, the working fluid 20 may expand and cool. Further, the release of the working fluid 20 and absorbed heat from the heating section 12 through the orifice member 26 may be continuous, instead of intermittent as with the pressure relief valve 22. It is foreseen that the orifice member 26 may also be adjustable, allowing for control over the rate of working fluid 20 flow and, thereby, the transfer of heat.

It is further foreseen that a release member may be adjustable, along with the one way check valve 18, to allow for operation of the device in reverse should it be so desired. In such a reverse operation, the portions of the device identifying the heating section 12 and cooling section 14 during standard operation may effectively switch. Thereby the heating section 12 during standard operation may function as the cooling section 14 during reverse and the cooling section 14 during standard operation may function as the heating section 12.

Heat Source

In multiple embodiments, it is foreseen that the heat source may be one of a number of non-electric based sources, including but not limited to ambient heat, solar radiation, geothermal heat, or even body heat, such as that generated by a human. Determination of the heat source is generally based on the desired use of the device 10. For example, use of the present heat transfer device 10 to heat water in a pool may utilize ambient heat, such as that generated within an attic over the course of a day or heat produced by solar radiation interacting directly with the heating section 12. In addition, use of the present device 10 to warm a paved path 40 during winter may utilize geothermal heat, heat stored in the ground, to warm working fluid 20 contained within the heating section 12. Further, use of the present device 10 to cool a person may utilize heat produced by that person's body, body heat, to warm working fluid 20 contained within the heating section 12. It is also foreseen that additional sources of heat may be utilized with the present device 10, beyond those identified above. For example, the heat source may be waste heat generated by devices, systems, and processes, such as that generated by car engines, exhausts, and batteries, motors of electric vehicles, computer and server rooms, and industrial dryers, which would normally not be utilized.

Working Fluid

While in the earlier embodiments the working fluid 20 is described as glycol, corn oil, acetone and butane, it is foreseen that the working fluid may be one of almost any number of other fluids, gas or liquid at room temperature and atmospheric pressures. For example, the working fluid 20 may in particular embodiments include oxygen, nitrogen, carbon dioxide, vegetable oil, mineral oil, ammonium hydroxide, ether, butane, an alcohol (like methanol or ethanol), or the like. In fact, any fluid with expansion characteristics and boiling and melting points which can provide a desired efficient flow and transfer of heat in a particular use of the device 10 may be utilized.

However, determination of the best working fluid 20 may be based on the use of the device 10 and temperatures of the general areas surrounding the heating section 12 and cooling section 14 during a desired effective period. For example, use of the present device 10 to heat a pool or cool an attic may utilize glycol or corn oil as a working fluid due to its ability to expand upon heating and low freezing point. In addition, determination of the best working fluid 20 may also be based on the desired internal operation of the present device 10. For example, should a user desire the device to utilize the phase change of a fluid to facilitate the transfer of heat away from the heating section 12 towards the cooling section 14, selection of a fluid which is generally liquid at the temperatures surrounding the cooling section 14 and gaseous at the temperatures surrounding the heating section 12 may be best. Thereby, the working fluid 20 may vaporize and condense when flowing through the device 10. Furthermore, it is foreseen that the working fluid 20 may, in lieu of changing phases, remain fully a liquid or gas during operation of the present device 10.

Condensed Moisture Collector

Figure 7:
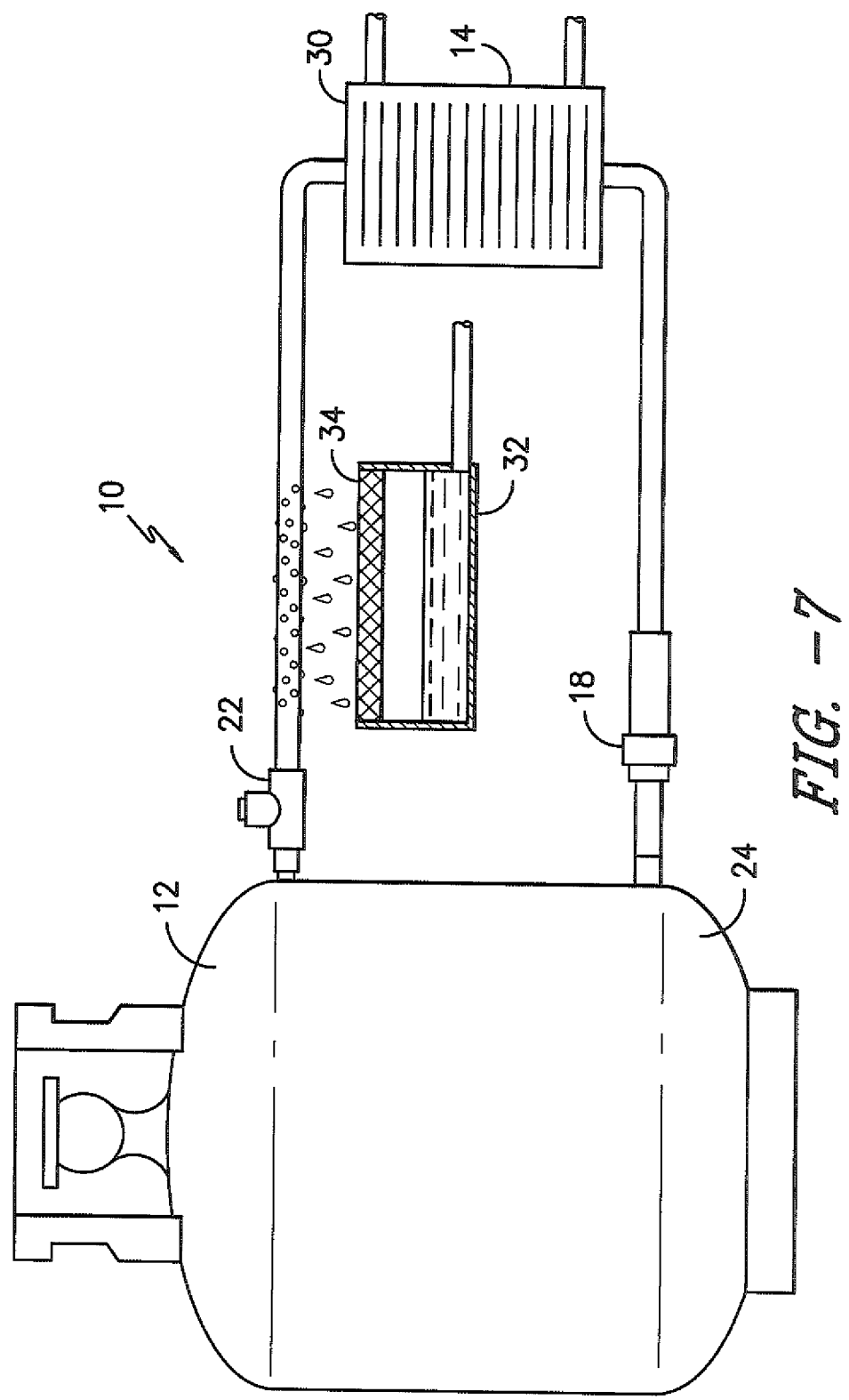
FIG. 7 is an elevation view of one embodiment of a heat transfer device including a condensed moisture collector and purification mechanism.

The present device 10, in certain embodiments, may further include a condensed moisture collector 32 which captures moisture which may condense on outside portions of the device 10, as in FIG. 7. For example, condensed moisture forming on the outside of a conduit may be captured by a container as it falls therefrom. Alternatively, condensed moisture may be collected by any receptacle, vessel, canister, can, box, holder, repository, or other structure sufficient to collect water. In use, condensed moisture may form on an outside portion of the present device 10 due to the differences in temperatures between that portion of the device and the surroundings. As such moisture forms, water is removed from the air, and humidity is reduced in the surrounding area. The condensed moisture may be fall or flow from the outside portion of the device into a condensed moisture collector 32. Such condensed moisture collector 32 may also remove such collected moisture from the surroundings, such as by being connected to a drainage system, to prevent the moisture from evaporating and increasing the humidity of the surroundings again. Such a condensed moisture collector 32 may be useful where the present device 10 is utilized in areas in which increased humidity or wetness may not be desired or may cause damage.

Purification Mechanism

In addition to the above condensed moisture collector 32, it is also foreseen that certain embodiments of the device 10 may also employ a purification mechanism 34 to purify the condensed moisture for consumption or use, as in FIG. 7. For example, condensed moisture may be purified by passing it through a filter, such as a drip filter with activated charcoal and baking soda. However, the purification mechanism 34 may be any device or method which removes or neutralizes impurities to produce useful water. For example, the purification mechanism 34 may involve sedimentation, ultraviolet light, the use of chemicals (chlorine, bromine, iodine, hydrogen peroxide, silver, etc.), filtration through mediums or membranes, or oxidation.

Additional Uses

In addition to the uses described above, it is foreseen that each embodiment may be utilized in a wide variety of applications. In fact, particular embodiments of the present heat transfer device 10 may remove heat—without a conventional electro-mechanical pump or compressor, or blower—from attics, crawl spaces, building walls and interiors, tents, vehicle interiors, vehicle engines, vehicle exhausts, batteries, vehicle brakes, motors of electric vehicles, clothing, headwear, and other garments, coolers, computer server rooms, laptops, firearm barrels, and even solar panels. In further examples, the present heat transfer device 10 may also add heat-without a conventional electro-mechanical pump or compressor, or blower—to snow, paved paths, pools, and crawl spaces. In fact, depending upon the elements utilized as heating and cooling sections 12,14, release member, and working fluid 20 and the conditions in which the elements of the device 10 are placed, the present device 10 may provide heat transfer between almost any two distinct areas having differing temperatures without use of conventional electro-mechanical pumps, compressors, blowers, or electricity.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

What is claimed is:

1. A heat transfer device comprising:
    a heating section having an inlet and outlet, wherein a working fluid absorbs heat from a heat source and is pressurized in said heating section without an electro-mechanical compressor;
    a cooling section having an inlet and outlet;
    a one-way check valve in fluid communication with said cooling section inlet and said heating section outlet to restrict the flow of said working fluid through said device to a single direction;
    a vaporization expansion evaporation section wherein the pressurized, heated working fluid is allowed to expand without altering the chemical composition of said working fluid, thus absorbing ambient heat from a space surrounding said vaporization expansion evaporation section; and
    wherein said working fluid is pressurized and flows within said device without requiring gravity or an electro-mechanical pump without altering said chemical composition of said working fluid.

2. The heat transfer device of claim 1, wherein said working fluid in said cooling section transfers heat into an area adjacent a portion of said cooling section.

3. The heat transfer device of claim 1, wherein said working fluid in said cooling section absorbs heat from an area adjacent a portion of said cooling section.

4. The heat transfer device of claim 1, wherein said heating section comprises a segment of uninsulated conduit.

5. The heat transfer device of claim 4, wherein said conduit comprises capillary tubing.

6. The heat transfer device of claim 1, wherein said heating section comprises a vessel.

7. The heat transfer device of claim 1, wherein said heating section comprises a heat exchange device in thermal contact with said heat source.

8. The heat transfer device of claim 1, wherein said cooling section comprises a segment of uninsulated conduit.

9. The heat transfer device of claim 8, wherein said conduit comprises capillary tubing.

10. The heat transfer device of claim 1, wherein said cooling section comprises a vessel.

11. The heat transfer device of claim 1, wherein said cooling section comprises a heat exchange device in thermal contact with an area adjacent said cooling section.

12. The heat transfer device of claim 1, wherein said working fluid vaporizes after release from said heating section into said cooling section and condenses in said cooling section.

13. The heat transfer device of claim 1, wherein said working fluid within said heating and cooling sections comprises a gas.

14. The heat transfer device of claim 1, wherein said working fluid within said heating and cooling sections comprises a liquid.

15. The heat transfer device of claim 1, wherein said heat source is selected from the group consisting of solar radiation, waste heat, body heat, geothermal heat, and ambient heat.

16. The heat transfer device of claim 1, further comprising a condensed moisture collector to collect moisture forming on the outside of said device.

17. The heat transfer device of claim 16, further comprising a purification mechanism for said condensed moisture collected from said device.

18. The heat transfer device of claim 1, further comprising a release member in fluid communication with said heating section outlet and said cooling section inlet to regulate the release of heated working fluid therefrom.

* * * * *